United States Patent [19]

Nodelman et al.

[11] Patent Number: 5,477,343
[45] Date of Patent: Dec. 19, 1995

[54] MICROGRAPHIC READER WITH DIGITIZED IMAGE

[75] Inventors: Semyon Nodelman; David M. Rose, both of San Diego; Robert A. Poyner, Santer, all of Calif.

[73] Assignee: Anacomp, Inc., Carmel, Ind.

[21] Appl. No.: 42,126

[22] Filed: Apr. 2, 1993

Related U.S. Application Data

[63] Continuation-in-part of Ser. No. 900,903, Jun. 18, 1992, abandoned.

[51] Int. Cl.⁶ ..................................... H06N 1/08
[52] U.S. Cl. .......................... 358/487; 358/500
[58] Field of Search .................. 358/287, 102, 358/294, 296, 75, 78, 81, 104, 105, 257, 258, 487, 214, 216, 500, 506, 509, 527, 215, 93, 97, 54, 214; 382/57, 61; 355/41, 40, 43, 44, 45, 64, 202, 218; 250/571, 559, 201; 356/443, 444; 348/620, 452, 97, 459

[56] References Cited

U.S. PATENT DOCUMENTS

| | | | |
|---|---|---|---|
| 4,324,484 | 4/1982 | Johnson | 355/5 |
| 4,513,390 | 4/1985 | Walter et al. | 364/900 |
| 4,553,261 | 11/1985 | Frosst | 382/57 |
| 4,682,242 | 7/1987 | Sugita | 358/285 |
| 4,700,237 | 10/1987 | Yoshioka et al. | 358/287 |
| 4,825,065 | 4/1989 | Imai | 250/205 |
| 4,837,450 | 6/1989 | Satomura et al. | 250/571 |
| 4,897,735 | 1/1990 | Oneda | 358/449 |
| 4,903,141 | 2/1990 | Morton et al. | 358/448 |
| 4,926,250 | 5/1990 | Konishi | 358/75 |
| 4,934,821 | 6/1990 | Morton | 358/102 |
| 4,970,545 | 11/1990 | Inagawa | 355/45 |
| 5,020,115 | 5/1991 | Black | 382/44 |
| 5,028,128 | 7/1991 | Onuki | 353/122 |
| 5,038,379 | 8/1991 | Sano | 382/1 |
| 5,061,955 | 10/1991 | Watanabe | 355/45 |
| 5,065,182 | 11/1991 | Fujita et al. | 355/202 |
| 5,083,214 | 1/1992 | Knowles | 358/403 |
| 5,084,756 | 1/1992 | Muehlhausen | 358/214 |
| 5,157,482 | 10/1992 | Cosgrove | 358/54 |
| 5,218,459 | 6/1993 | Parulski et al. | 358/451 |
| 5,241,659 | 8/1993 | Parulski et al. | 395/164 |

(List continued on next page.)

FOREIGN PATENT DOCUMENTS

| | | | |
|---|---|---|---|
| 0346019 | 12/1989 | European Pat. Off. | G03B 21/11 |
| 3447609 | 7/1986 | Germany | H04N 1/36 |
| 0021272 | 2/1981 | Japan . | |
| 0060974 | 5/1981 | Japan . | |

OTHER PUBLICATIONS

"Merkel Automated Microform Digitizing Systems", Model M400SL Microfilm Digitizer, Merkel Engineering, Inc., Walnut, Calif., 2 pg. brochure.

"Hal MicroScanner, Models 3202, 3202, 3204", Hudson–Allen Limited, Victoria, Australia, 2 pg. brochure.

"TII Mentor®–1000, Response in 3 Seconds or Less", Model 1000–S, BMIS Micrographics, U.S.A., 3 pg. brochure.

"Digital Processing Gives Canon an Automatic Advantage", Canon Digital Microprinter 100, Canon Micrographics, Lake Success, N.Y., 6 pg. brochure.

*Primary Examiner*—Paul Ip
*Attorney, Agent, or Firm*—Dressler, Goldsmith, Shore & Milnamow, Ltd.

[57] ABSTRACT

A microfilm reader is provided which not only permits an operator to visually examine previously created images, stored on microfilm, but also to create a digitized representation of the image being viewed. The reader includes an opto-mechanical system for displaying a selected image and also for directing the image to a digitizing sensor. The sensor is coupled to electronic circuitry for storing the digitized representation either in black and white form or with a gray scale. The contents of the storage unit can be accessed a microcomputer coupled to the reader for purposes of manipulating the digitized representation or for transmitting it to another display or an output device, such as a facsimile machine.

19 Claims, 15 Drawing Sheets

U.S. PATENT DOCUMENTS

| | | | |
|---|---|---|---|
| 5,249,017 | 9/1993 | Kokura | 355/68 |
| 5,321,500 | 6/1994 | Capitant et al. | 348/97 |
| 5,329,383 | 7/1994 | Collette | 358/500 |
| 5,349,546 | 9/1994 | Sharman | 364/724.01 |
| 5,355,178 | 10/1994 | Parulski | 348/620 |

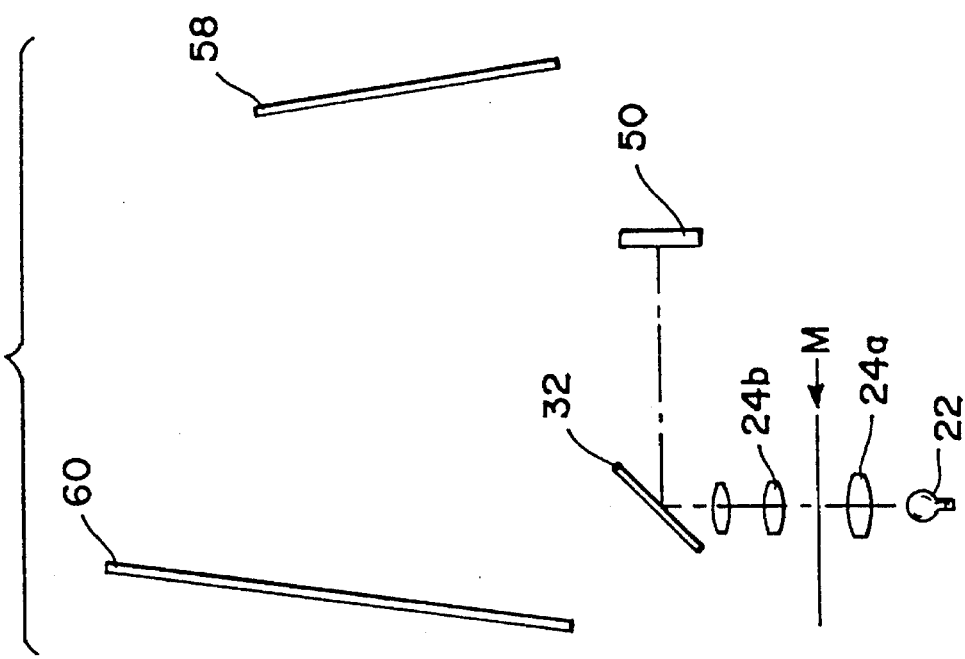
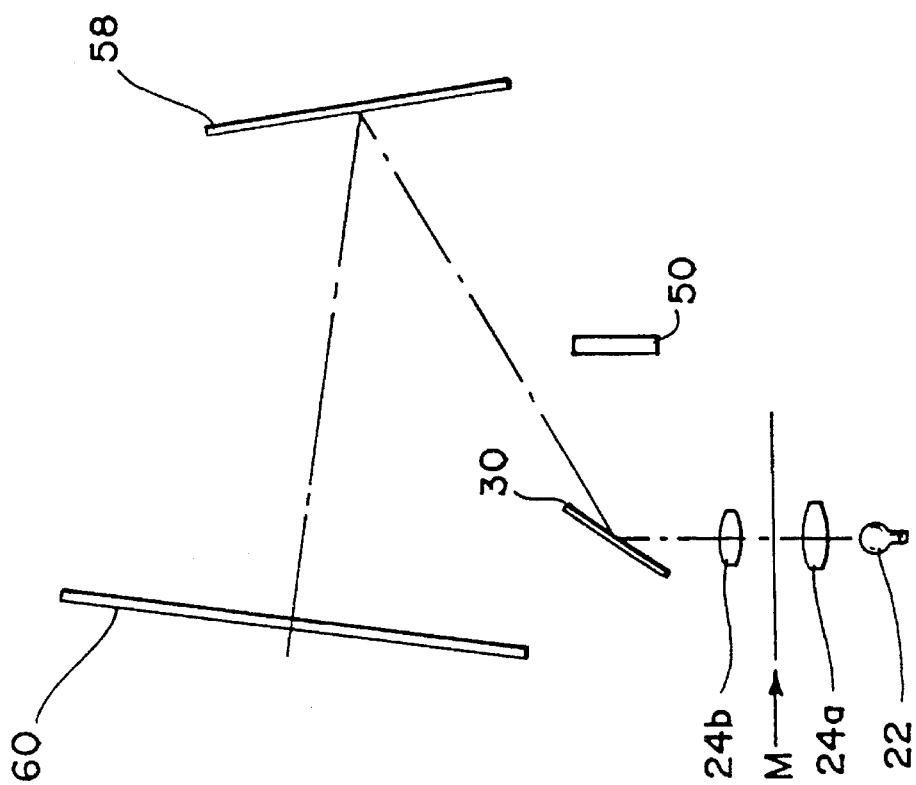

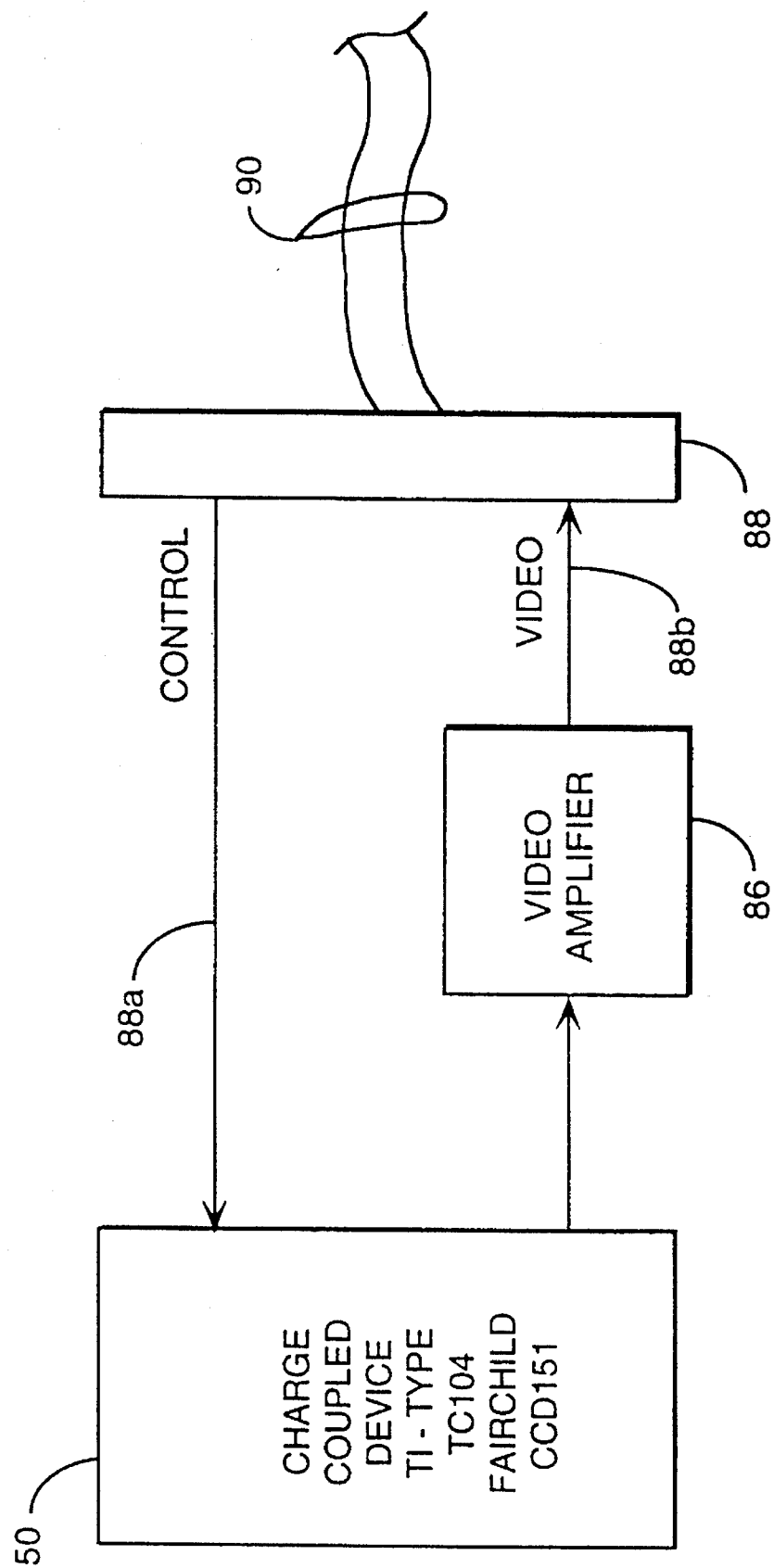

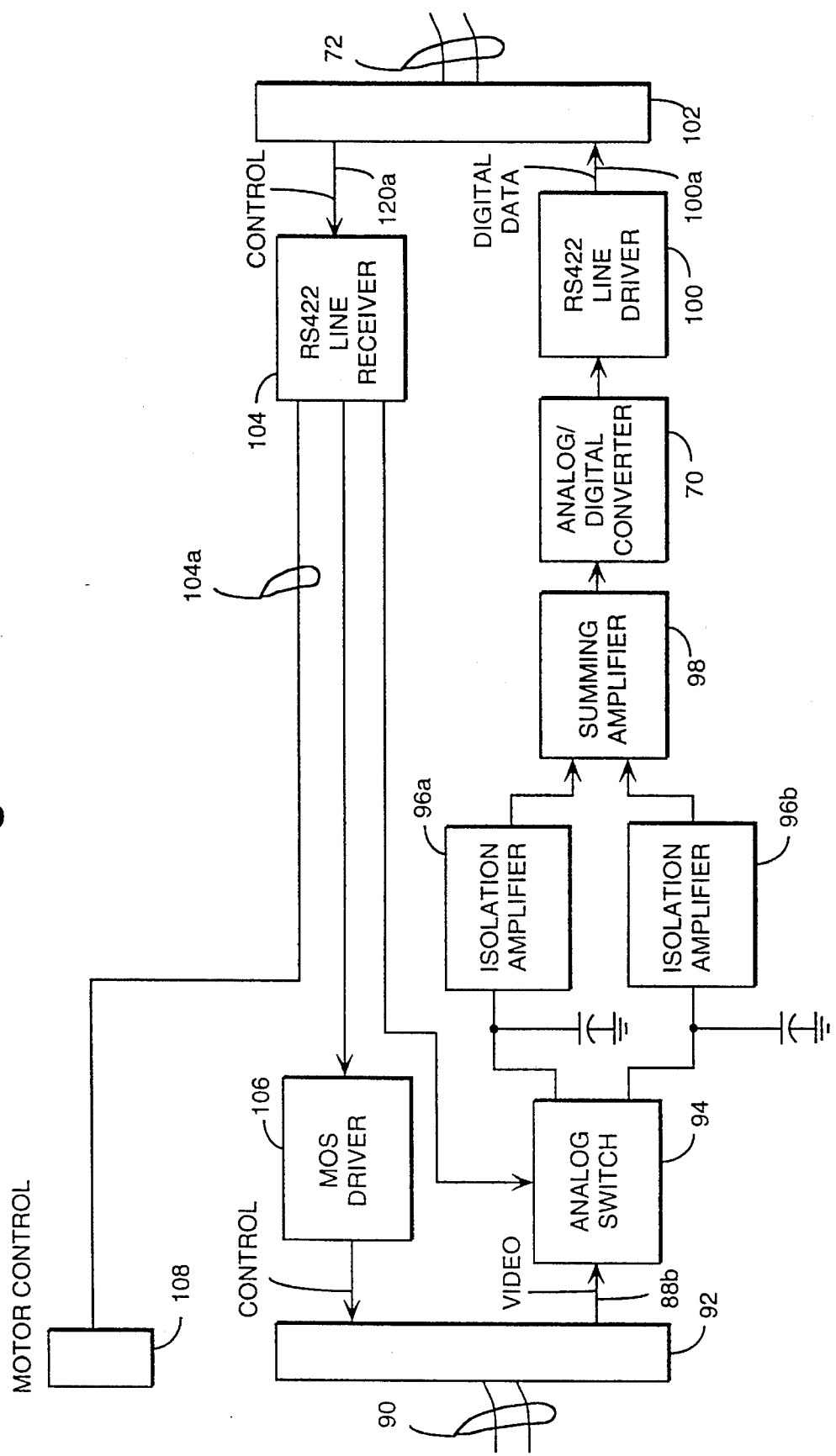

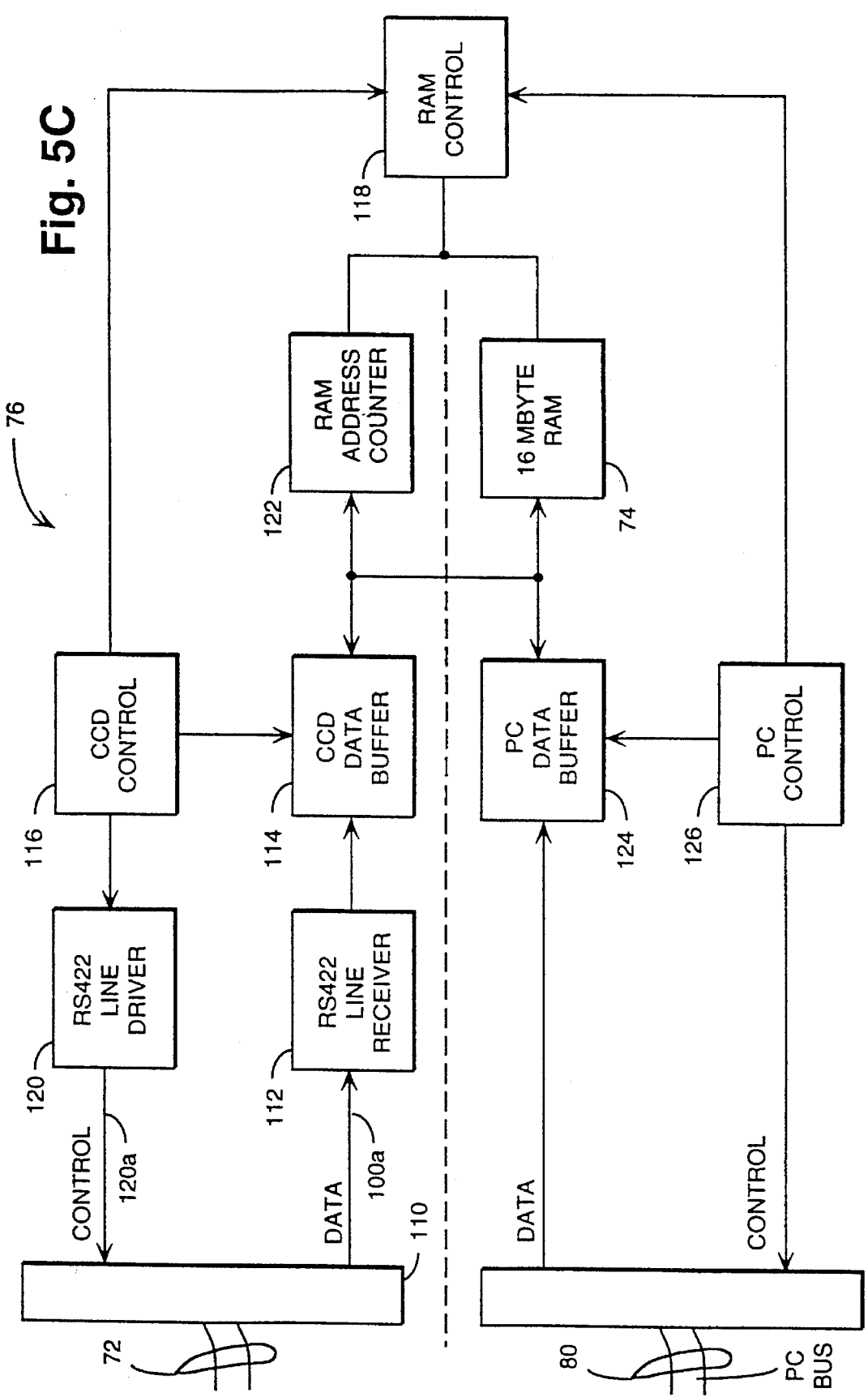

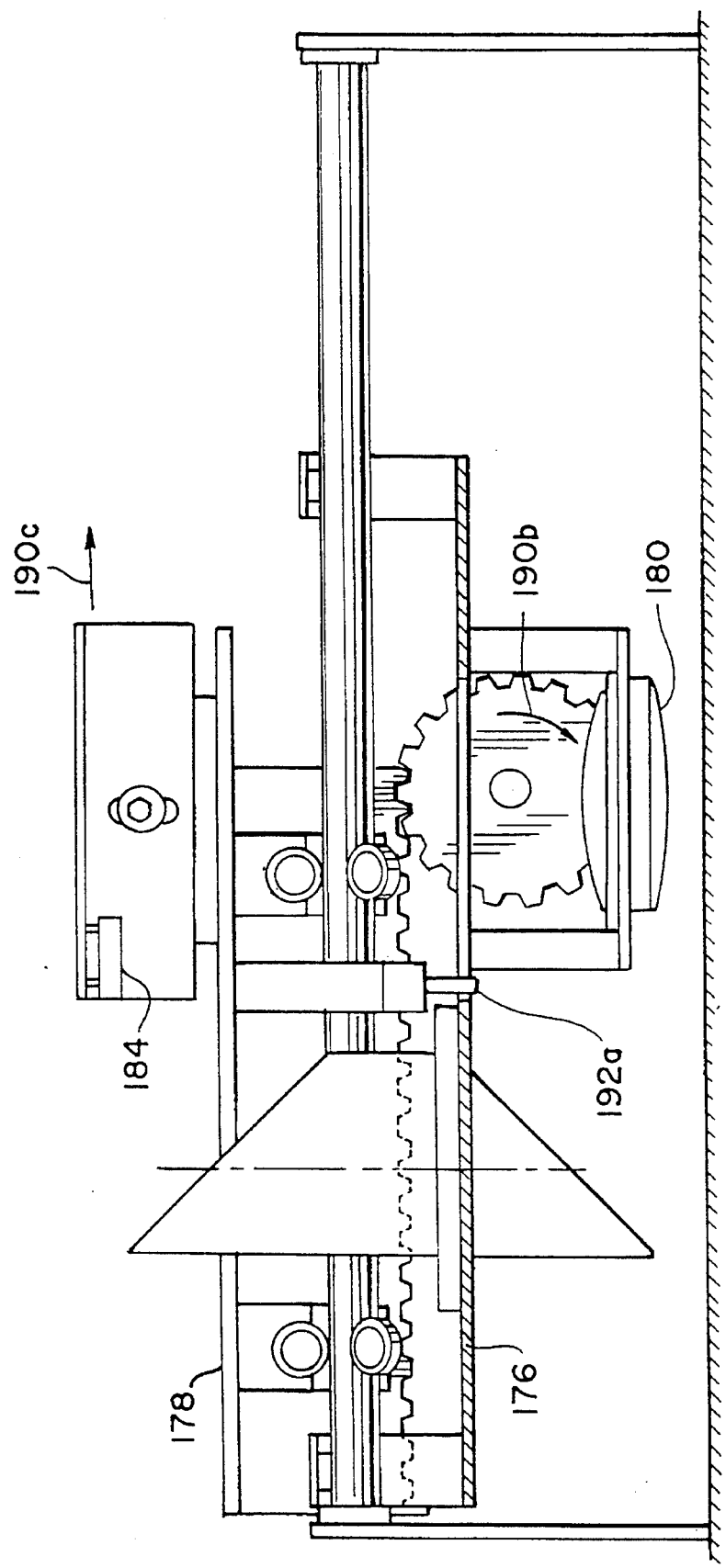

MICROGRAPHIC READER WITH DIGITIZED IMAGE

This is a continuation-in-part of Rose et al., U.S. patent application Ser. No. 07/900,903, filed Jun. 18, 1992, now abandoned entitled MICROGRAPHIC READER WITH DIGITIZED IMAGE.

FIELD OF THE INVENTION

The invention pertains to electronic systems for digitizing images. More particularly, the invention pertains to electronic systems for digitizing previously created images carried on a film medium.

BACKGROUND OF THE INVENTION

Micrographic images, such as "COM", fiche, or "source document" 16 mm rolls, represent a permanent record of information which is usually archived in one location. A need exists to periodically retrieve this information by a user remote to the archive facility.

Known ways in which such information can be retrieved include either making a paper reproduction using a reader/printer, or a film duplicate using a film copying device. Either reproduction must then be sent by mail or other carrier. The paper reproduction can be faxed.

It would be desirable to be able to eliminate the intermediate step of paper or film copy and transmit the data directly, electronically. In addition, it would be desirable to be able to preview the images on the film prior to digitizing for selection and verification purposes.

SUMMARY OF THE INVENTION

This invention fulfills a need to retrieve archived micrographic images by digitizing them and sending them to a remote user electronically, rather than making a duplicate copy on a medium and transporting the duplicate. This not only speeds transportation of the image and eliminates labor steps, but allows the user to capture the image by the medium of his choosing (paper printer, fax, optical disc, magnetic media, etc.).

The digitization is accomplished by projecting the micrographic image onto a detector array which scans the image. A programmed computer is used to capture the data, decipher it, and manipulate it for use by any of the data storage or transmission peripherals available.

The digitizer is preferably built into a film or microfiche reader which allows the user to preview and to easily select the frame to be digitized. The digitized image is then displayed on a monitor, under the control of the computer, for previewing or editing prior to recording or transmitting.

An apparatus in accordance with the present invention includes a reader housing which carries a film illumination stage. Radiant energy from a source of radiant energy is directed at the illumination stage.

When a portion of an image carrying film medium is positioned on the illumination stage, a visually perceptible display of a selected image can be projected onto a viewing area. The selected image is projected onto the viewing area by a first or viewing mirror with a first orientation. A second or digitizing mirror is carried adjacent to the first mirror.

The first mirror and the second mirror are movable and positionable by a linear motion fixture. The fixture has a frame, attached to the housing, and a slide, linearly movable with a motor, between first and second positions.

When the slide is in the first position, the first mirror directs the projected image onto the viewing screen. When the slide is in the second position, the second mirror directs the projected image onto a digitizing sensor.

Alternately a slidable two element digitizing stage can be located to intercept the projected image. The stage has first and second parts movable relative to one another.

A motor drives the first part. The digitizing sensor is carried on the first part in this embodiment. A slidably engagable coupling links the two parts.

The motor positions both parts at a digitizing location. It then moves the first part to enable the sensor to scan the image. The two parts then move to a non-digitizing location.

The digitizing sensor can be a linear or a two-dimensional charge coupled device (CCD). The linear element is linearly scanned across the projected image.

A sequence of digitized image pixels can be produced by control and storage circuitry coupled to the CCD element. Each pixel can be represented by a single bit, 1 or 0, or by multiple bits to provide a gray scale.

The digitized image can be displayed on a video monitor and checked subsequently. The digitized image can be processed, transmitted to a local or a remote site, and converted to hard copy.

A remotely controllable transport for a reel or a cartridge film medium can be coupled to the reader to provide remote access to a selected image prestored on the medium. The digitized image can be filtered, rotated, or processed using software.

Numerous other advantages and features of the present invention will become readily apparent from the following detailed description of the invention and the embodiments thereof, from the claims and from the accompanying drawings in which the details of the invention are fully and completely disclosed as part of this specification.

BRIEF DESCRIPTION OF THE DRAWINGS

FIG. 3A is a diagram of the viewing mode optical path of the unit of FIG. 2;

FIG. 3B is a diagram of the digitizing mode optical path of FIG. 2;

FIG. 5A through 5C taken together are a more detailed block diagram of the electronic system of FIG. 3;

FIG. 10C is a side elevational view of the scanner system once the digitizing process has been initiated;

DETAILED DESCRIPTION OF THE PREFERRED EMBODIMENT

Figure 1:
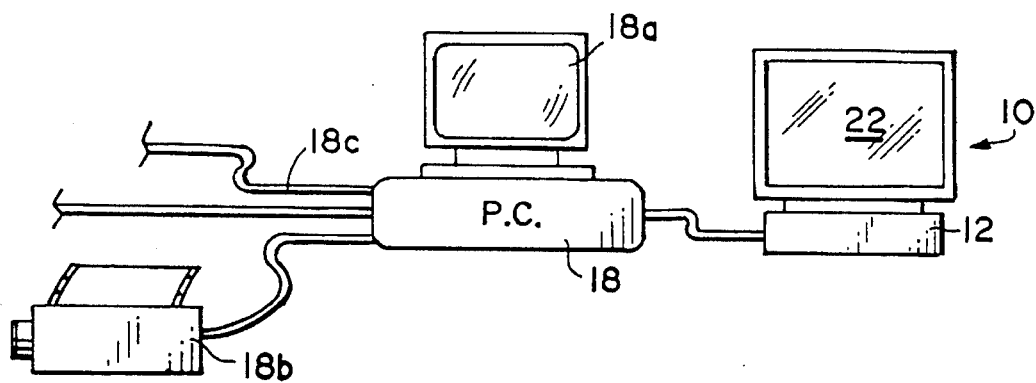
FIG. 1 is an overall diagram of a digitizing system in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 2:
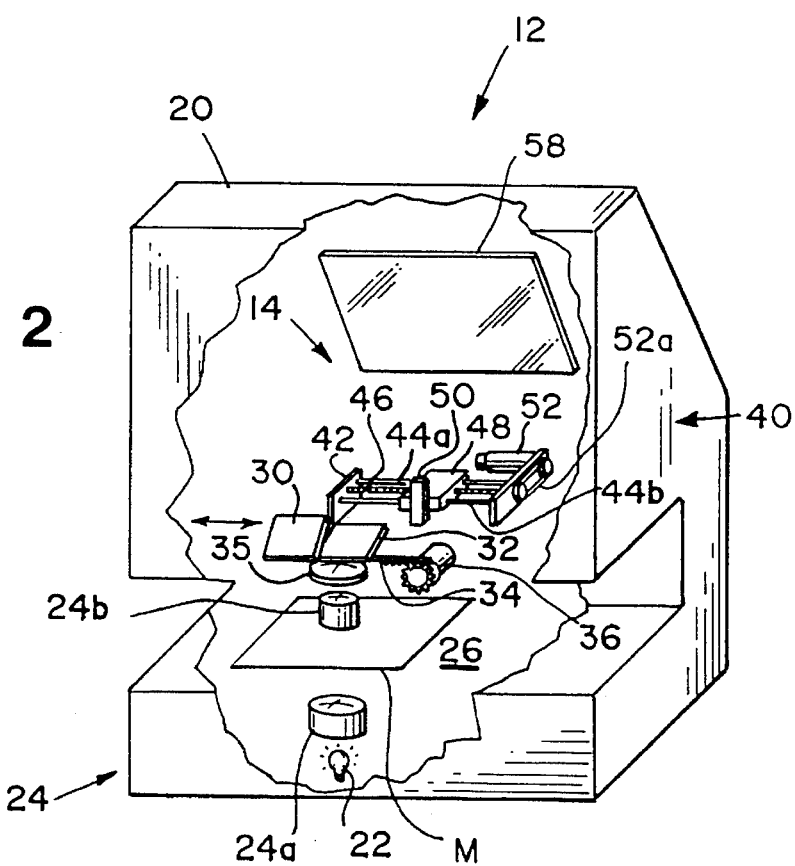
FIG. 2 is a perspective view of a film display unit partly broken away to illustrate the opto-mechanical components thereof in accordance with the present invention.

FIGS. 1 and 2 illustrate a system 10 for digitizing micrographic images and for electronically storing or transmitting them. It includes a 105 mm microfiche reader 12 (16 mm roll attachment optional) with a built-in digitizing mechanism 14 and electronics 16 (see FIG. 4).

The system 10 also includes a computer 18, such as an IBM-type personal computer (PC) for manipulating the data. The PC 18 has a video display 18a, a printer 18b, and a communications or fax port 18c.

The system 10 combines the digitizing mechanism 14 with a reader 12 and the versatility of the PC 18. Using this combination, traditional viewing can be done. The image can also be digitized and then subjected to information processing or management operations, such as printing on a high quality printer, faxing, storing on magnetic disc, magnetic tape, optical disc, or transmitting to any number of devices on a network.

The digitized data from the image is stored in random access memory in the PC 18. The pixels are represented by digital values, such as 1 or 0 (black or white), or shades on a gray scale.

The reader 12 includes a housing 20 which supports the various components thereof. Supported by the housing 20 is a source of radiant energy 22 and a lens system 24. The lens system 24 includes a condenser lens 24a, and a projection lens 24b.

A medium M, which could be a fiche or a portion of a roll of 16 mm film, is supported on a reading or projection surface 26 carried by the housing 20. The medium M is positioned such that a selected image to be projected is located in the optical path extending between the condenser lens 24a and the projection lens 24b.

A viewing mirror 30 and a digitizing mirror 32 are each carried on a linearly-movable mirror transport member 34. The two mirrors have different angular orientations. In addition, as described subsequently, a reformatting lens 35 is also carried on the movable member 34 adjacent to the mirror 32.

The linearly-movable member 34 has first and second positions. The member 34 is moved between the first and second positions by a rack carried on the member 34 and a gear carried on a motor 36.

The motor 36 is operated open loop with limit switches and linearly moves the mirrors 30 and 32, along with the reformatting lens 35, into and out of the optical path of the projection lens 34b. Optical limit switches are preferably used.

Spaced from the linearly-movable mirror transport 34 is a scanning stage 40. The scanning stage 40 includes a stationary frame 42 which is carried by the reader housing 20. The frame 42 includes two linear, elongated bearing slides 44a, 44b with a lead screw 46 extending therebetween. Carried on the lead screw 46 is a sensor scanning stage 48.

In a preferred embodiment, the scanning stage 48 carries a linear CCD sensor 50. Representative commercially available sensors which could be used include Texas Instruments type TC104, and Fairchild type CCD151. Alternately, instead of a linear sensor, such as the sensor 50, a two-dimensional CCD array could be used.

The sensor 50 is carried on the lead screw 46 and linearly travels back and forth thereon as the lead screw 46 is rotated by a drive system 52. The drive system 52 includes a motor with velocity feedback.

The output shaft of the motor in the drive system 52 is coupled via a flexible belt 52a to the lead screw 46. The scanning stage 48 linearly moves on the spaced apart guides 44a, 44b by means of three linear ball bearings, two carried on the slide 44a and one carried on the slide 44b.

The housing 20 also carries a fixed viewing mirror 58 and a fixed viewing screen 60, best seen in FIGS. 3A and 3B.

With reference to FIG. 3A, when a selected portion of the medium M carrying an image to be viewed or digitized is located on the viewing station 26 in the optical path between the lenses 24a, 24b, that image is projected through the lens 24b toward the mirrors 30 and 32. When the mirror transport member 34 is in a first or viewing position, the mirror 30 deflects the transmitted image to the viewing mirror 58, which in turn, deflects it to the viewing screen 60 for normal viewing by an operator.

To carry out a digitizing function, as illustrated in FIG. 3B, the mirror transport member 34 is moved to the second position, and thereby linearly moves the digitizing mirror 32 into the optical path of the image projected from the lens 24b. The reformatting lens 35, carried on the mirror transport member 34 along with mirror 32, reformats the projected image and projects that reformatted image onto the mirror 32. The mirror 32, in turn, deflects the reformatted image onto the scanning stage 48.

The drive system 52 is then actuated to linearly move the sensor 50 across the image projected thereon. As the sensor 50 is moved, the elements thereof are repetitively scanned electronically in a first direction and moved mechanically via the scanning system 40 in a direction which is perpendicular to the orientation of the sensor 50, thereby producing a scanned electronic output of the selected image.

The drive system 52, which incorporates a motor with velocity feedback, provides for precise velocity control. This, in turn, contributes to a more accurate and precise scan of the image.

Figure 6:
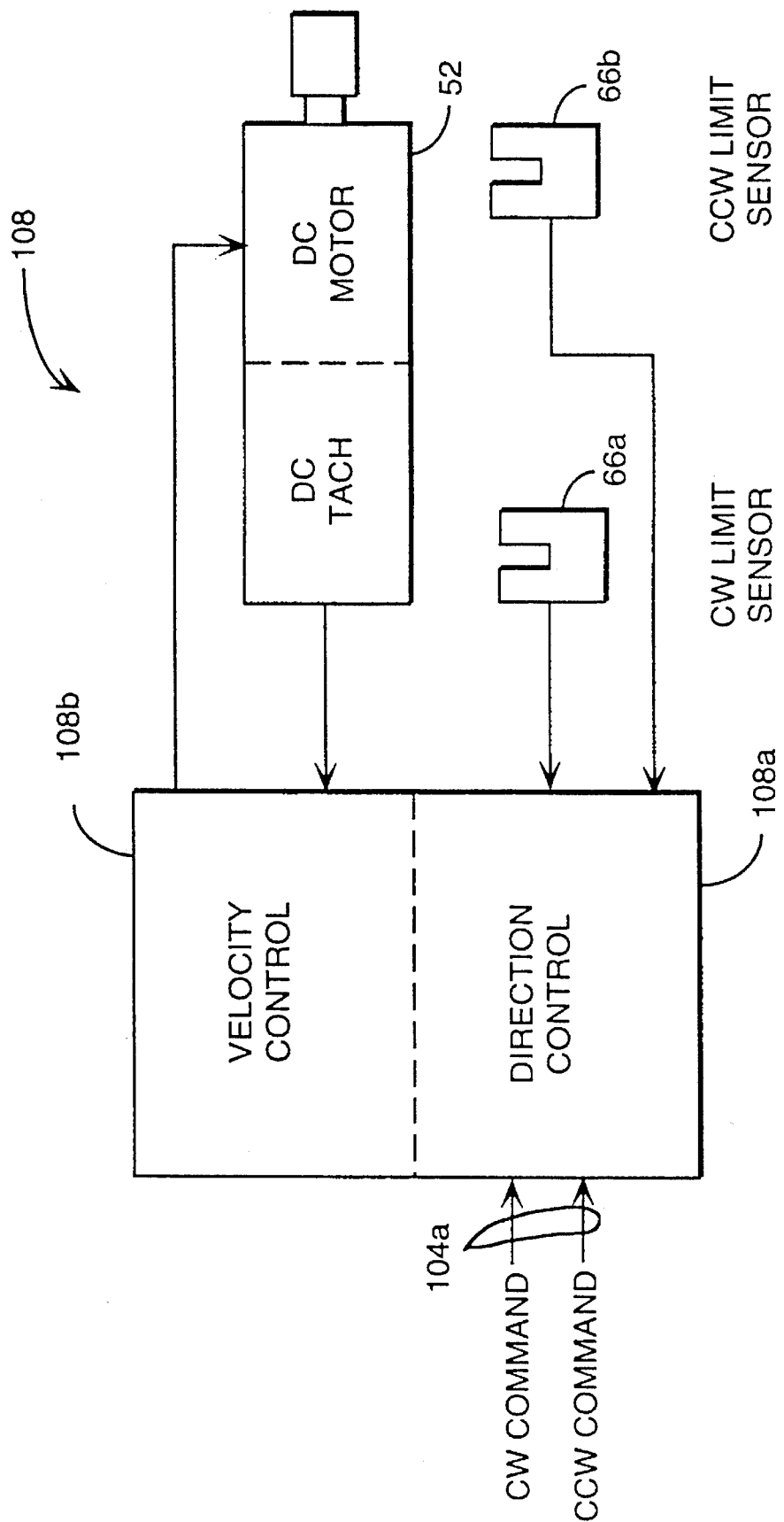
FIG. 6 is a block diagram of the motor control of the system of FIG. 1.

Optical limit switches 66a, 66b, best illustrated in FIG. 6, are located at each end of the scanning frame 42. Comparable optical limit switches are also positioned at each end of the movement range of the mirror transport member 34.

The belt 52a, which couples the drive unit 52 to the lead screw 46, results in a very compact arrangement for the mechanism 40.

The mirrors 30 and 32 are located at first and second orientations. Neither the mirror 30 nor the mirror 32 is intended to rotate.

As a result of using the linearly-movable mirror transport member 34, which carries both the mirror 32 and the reformatting lens 35, it is possible to maintain the angular relationship between the mirror 32 and the sensor 50 very precisely with respect to the projected image. In addition, since the lens 35 is carried along with the mirror 32, only a single linear mechanical motion is required to direct the selected image projected from the medium M to either the viewing screen 60 or the sensor 50. The use of lead screw 46 in combination with linear guides 44a, 44b, and the three linear bearings upon which the stage 48 slides in combination with the drive system 52, results in a very stable, highly accurate, and very linear scan across the projected image.

Figure 4:
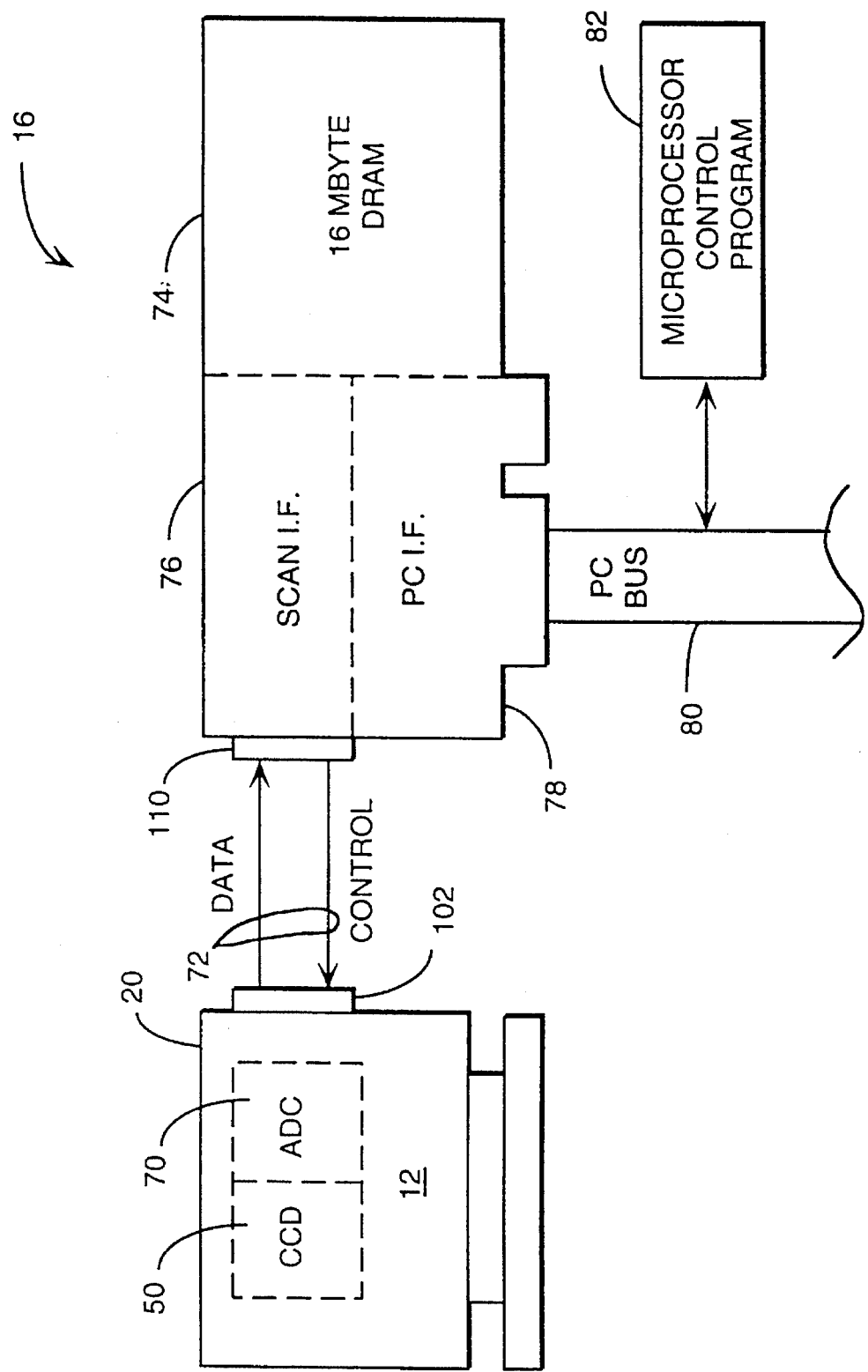
FIG. 4 is an overall block diagram illustrating various electronic components of the system of FIG. 1.

FIG. 4 illustrates a block diagram of the electronic system 16 for the reader/digitizing unit 10. The electronic system 16 includes an analog-to-digital converter 70, which is coupled to the linear CCD sensor 50. The analog-to-digital converter 70 is located within the housing 20.

A bidirectional communications cable 72 links digitized output, representing digitized representations of sensed pixels of the selected image, to a storage unit 74 carried within the computer 18. The analog-to-digital converter 70 is coupled to the storage unit 74 via the cable 72 and a scanner interface 76. A PC interface 78 couples the storage unit 74 via a PC bus 80 to the microprocessor 82 for the computer 18.

The storage unit 74, scanner interface 76, and computer interface 78 are all carried within the housing for the computer 18. Up to 8 bits per pixel for providing a gray scale can be transmitted between the analog-to-digital converter 70 and the storage unit 74 on the cable 72.

FIGS. 5A–5C illustrate in more detail the electronic system 16. In FIG. 5A, the CCD sensor 50, which is carried on the scanning stage 48, is coupled to an output video amplifier 86. A connector 88, carried on the scanning stage 48, transmits control signals on a line 88a to the sensor 50 and receives analog output signals from the video amplifier 86 on a line 88b.

A flexible multi-conductor cable 90 extends between the linearly-movable connector 88 and a fixed CCD connector 92 carried within the housing 20. Video output on the line 88b is coupled via an analog switch 94 to first and second isolation amplifiers 96a or 96b. The outputs of the isolation amplifiers 96a, 96b are directed to a summing amplifier 98.

The output of the summing amplifier 98 provides an analog input to the analog-to-digital converter 70. The output from the analog-to-digital converter 70, via line driver circuitry 100 and one or more lines 100a, is coupled to a connector 102. Input from the connector 102, via line-receiver circuitry 104, is coupled via MOS driver circuitry 106 and the cable 90 to control line 88a, to control the CCD sensor 50. In addition, the line receiver circuitry 104 provides drive input to motor control circuitry 108 for the motor drive units 36 and 52. The units 36 and 52, in turn, linearly actuate or move the mirror transport 34 and the scanning stage 48 as required.

The connector 102, which is carried on the housing 20, is in turn coupled via the multiple conductor cable 72 to a connector 110 located on the computer 18. The connector 110 is in turn connected to the scanner interface 76.

The scanner interface 76 includes line receiver circuitry 112, which receives digital representations of sensed pixels via lines 100a from analog-to-digital converter 70. The digitized output from line receiver circuitry 112 is in turn coupled to a CCD data storage buffer 114.

The data buffer 114 operates under the control of CCD control circuitry 116, which in turns provides control inputs to memory control circuitry 118 and also output control signals to line driver circuitry 120. Output control circuits from the line driver control circuitry 120, via control lines in the cable 72, in turn provide inputs to the line receiver circuitry 104.

The memory control circuity 118, in combination with an address counter 122, enable storage of digitized pixel representations received in the data buffer 114 in the random access memory storage unit 74 for subsequent use. When the complete image being scanned by the scanning stage 48 has been digitized and stored in the memory unit 74, that stored representation can be dumped via PC data buffer 124 and control circuitry 126 to the data and control bus 80 of the microprocessor 82. Subsequently, the digitized information can then be displayed on the video monitor 18a to check the quality and characteristics of the digitized image.

FIG. 6 illustrates details of the control circuits 108 for the motor 52. The same motor control circuitry 108 can be used with either motor 36 or motor 52. However, motor 36 can preferably be run open loop using optical limit switches, such as 66a, 66b, to position the mirror transport 34 at end locations.

Signals received on the lines 104a from the line receiver circuitry 104 specify either a clockwise command or a counter-clockwise command. The control circuity 108 includes a direction control module 108a and a velocity feedback module 108b.

The end positions of either of the mirror transport 34 or the scanning stage 48 are established by using first and second optical limit switches 66a, 66b. The optical switches 66a, 66b provide, respectively, clockwise limit input or counter-clockwise limit input to the direction control 108a, depending upon the rotational position of the output shaft of the respective motor 36 or 52.

Figure 7:
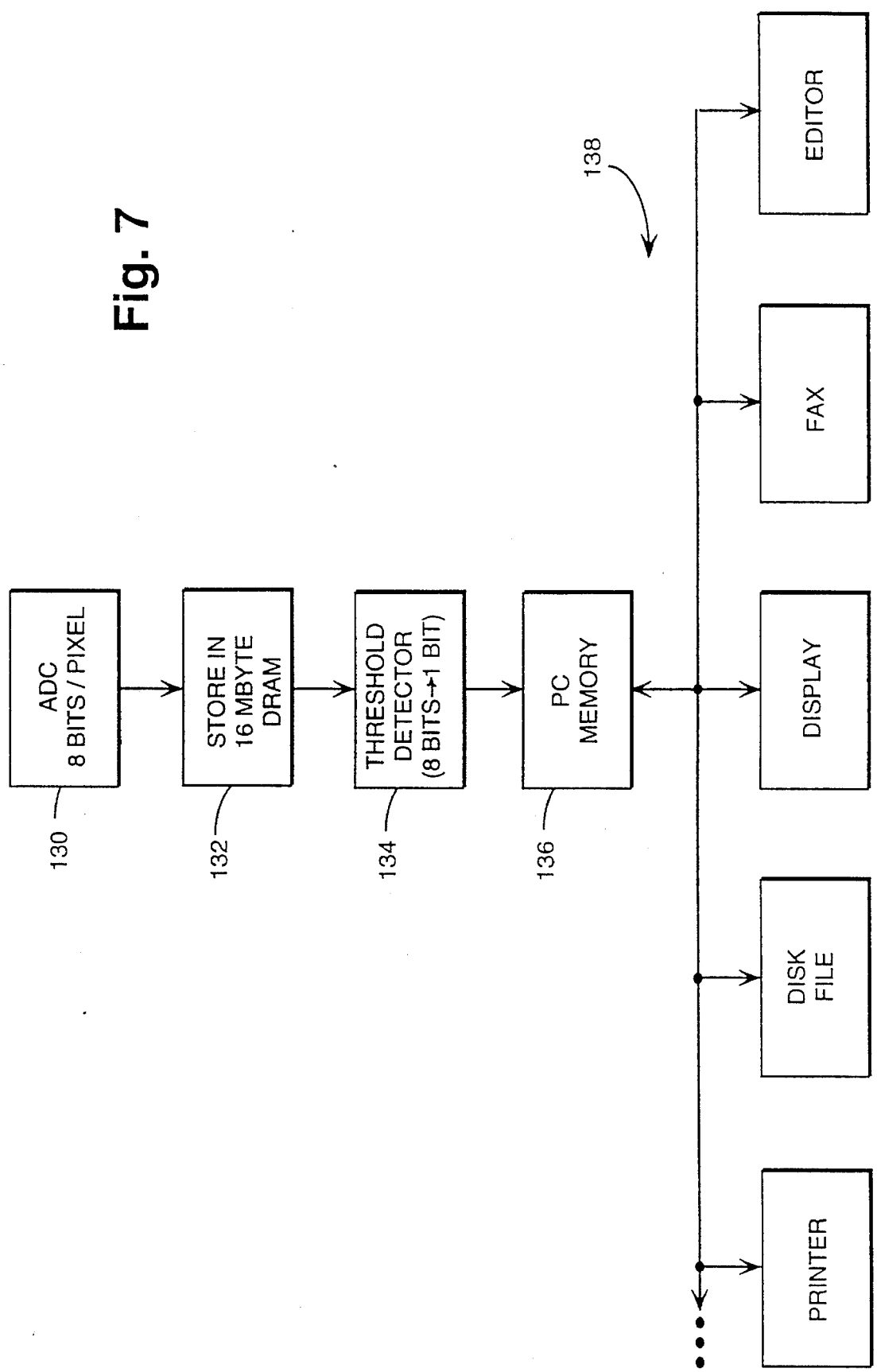
FIG. 7 is a flow diagram illustrating information flow in the system of FIG. 1.

FIG. 7 illustrates a method of digitizing in accordance with the present invention. In a step 130, each pixel is digitized and converted to an 8 bit representation by means of the analog-to-digital converter 70. The digitized representations, in a step 132, are in turn stored in the dynamic random access memory module 74.

Subsequently, the processor 82 can make a threshold determination, if desired, in a step 134, and convert the multiple bit representation per pixel into a single bit representation for purposes of display on the video terminal 18a. The processed and compressed representations of the image projected off of the medium M are then stored, in a step 136, in the memory for the computer 18. The image can then be displayed, printed, stored, or further edited in a step 138.

Using either commercially available software or hardware means, a determination can be made as to whether the shade of gray for each pixel will be represented as "on" (black) or "off" (white), or as a gray scale value in the final representation of the image. This enhancement determination can have various degrees of sophistication.

The final representation of the image is saved in any available standard graphics file format, such as "TIFF". The digitized image is also displayable on the PC monitor 18a for verification of a successful digitization, and then manipulation.

Manipulation can include combining several images, cut and pasting images, reversing the video polarity, varying the enhancement for specific features, inserting text, and editing imaged text (if optical character recognition (OCR) hardware/software is used in the PC). Once edited, the image can be used locally by being printed on the printer 18b or stored on any number of local storage media.

The digitized image can also be transmitted via the port 18c, or a network, or other data communication link. By installing an intelligent roll film carrier, a computer aided retrieval system can remotely request the system 10 to locate a frame, digitize it, and send it to the requestor without any intervention at the reader site.

Figure 8:
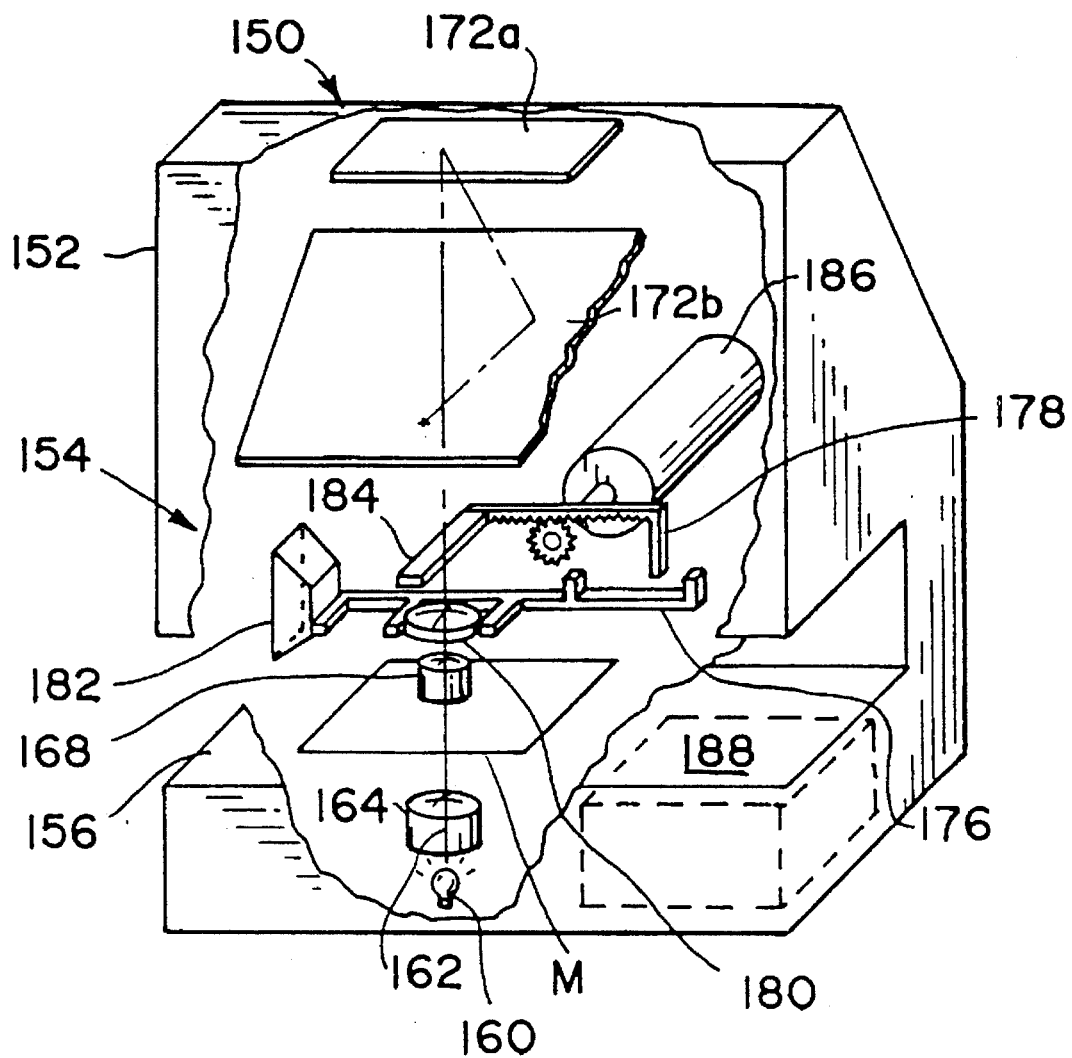
FIG. 8 is a perspective view of an alternate film display unit partly broken away to illustrate the opto-mechanical components of the system.

FIG. 8 illustrates an alternate viewing and digitizing unit 150. The unit 150 includes a housing 152 wherein an optical and electro/mechanical system 154 is carried.

The housing 152 provides a medium support 156 which an image carrying medium M can be positioned either manually or automatically.

A source of illumination 160 is also carried by the housing 152. A radiant energy beam 162 is focused in a condenser lens 164 and is directed to impinge upon an image I to be digitized which carried on the medium M.

The projected image from the medium M is directed to a projection lens 168 and, in a viewing mode, first onto viewing mirror 172a and then onto viewing mirror 172b. Subsequent to being reflected off of viewing mirror 172b the image is directed on to a rear projection display screen 174 (best seen in FIGS. 9A and 9B).

The housing 152 also carries a two part scanning stage. A first or reformatting part 176 and a second or sensing part 178 movably and slidably mounted with respect to the housing 152.

The first part 176 carries a reformatting lens 180. In addition, the first part also carries an inversion prism 182.

The second portion 178 of the scanning stage includes a CCD-type sensor 184. The sensor 184 can be moved back and forth relative to the lens 180.

A motor 186 is coupled to the second part 178 of the scanning stage by a rack and pinon drive system 186a and 186b. The motor 186 is thus able to very precisely move the second part 178 of the scanning stage so as to scan across an image I, stored on the medium M, projected from the reformatting lens 180.

An electronics package 188, illustrated in phantom, can be carried within the housing 150 to carry out interfacing and signal processing operations. The unit 150 can be coupled to the personal computer 18 as described previously.

Figure 9B:
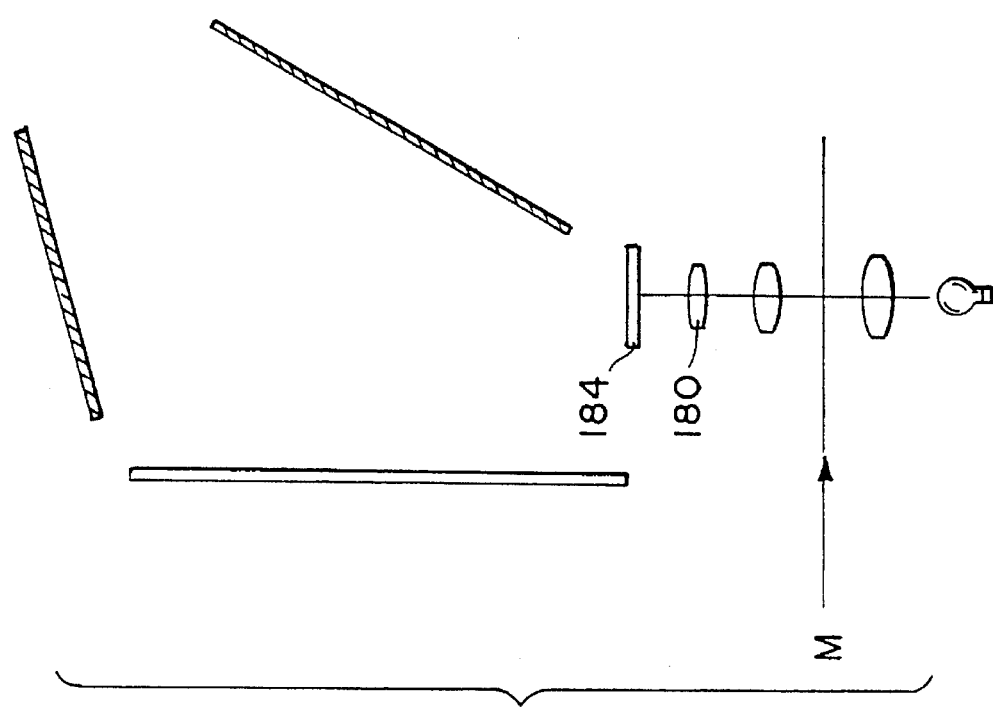
FIG. 9B illustrates the digitizing mode: the Reformatting Lens and the CCD sensor are shifted into the light path.
Figure 9A:
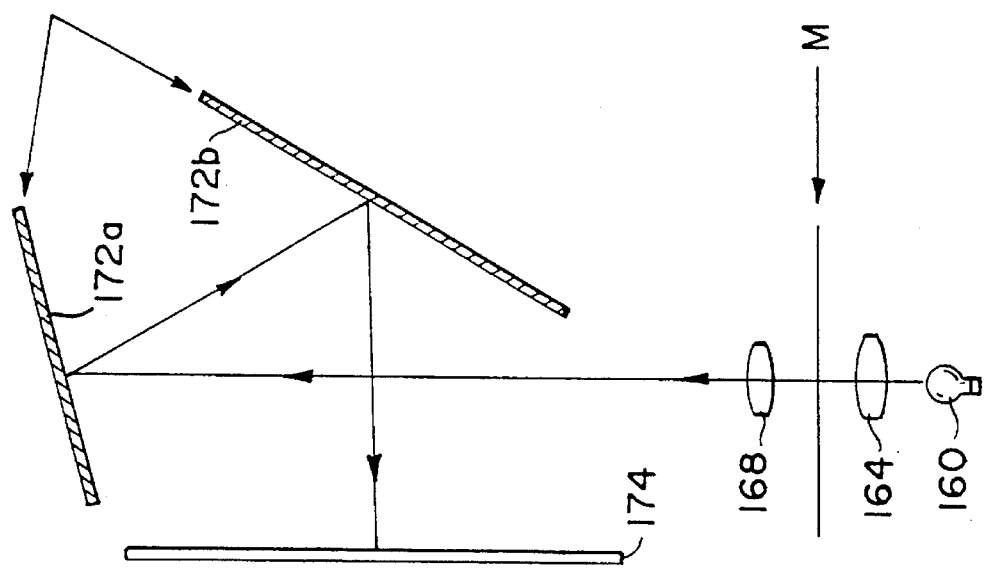
FIG. 9A illustrates the viewing mode: the image is projected onto the reader's screen.

FIGS. 9A and 9B illustrate optical relationships within the unit 150. FIG. 9A illustrates schematically an optical path for an image I carried on the medium M which has been selected to be projected onto the rear projection screen 174.

FIG. 9B illustrates the optical path when a digitizing operation is to be carried out. In this instance the projected image from the medium M, which has been projected through the reformatting lens 180, impinges upon the CCD-type sensor 184. Signals responsive to the incident light can be generated by the sensor 184.

FIGS. 10A through 10D illustrate the various phases of the scanning process. During the scanning process the first portion 176 of the scanning stage is moved so as to position the reformatting lens 180 between the image I projected from the medium M and the CCD-type sensor 184. The sensor 184 is then scanned across the image I.

Figure 10A:
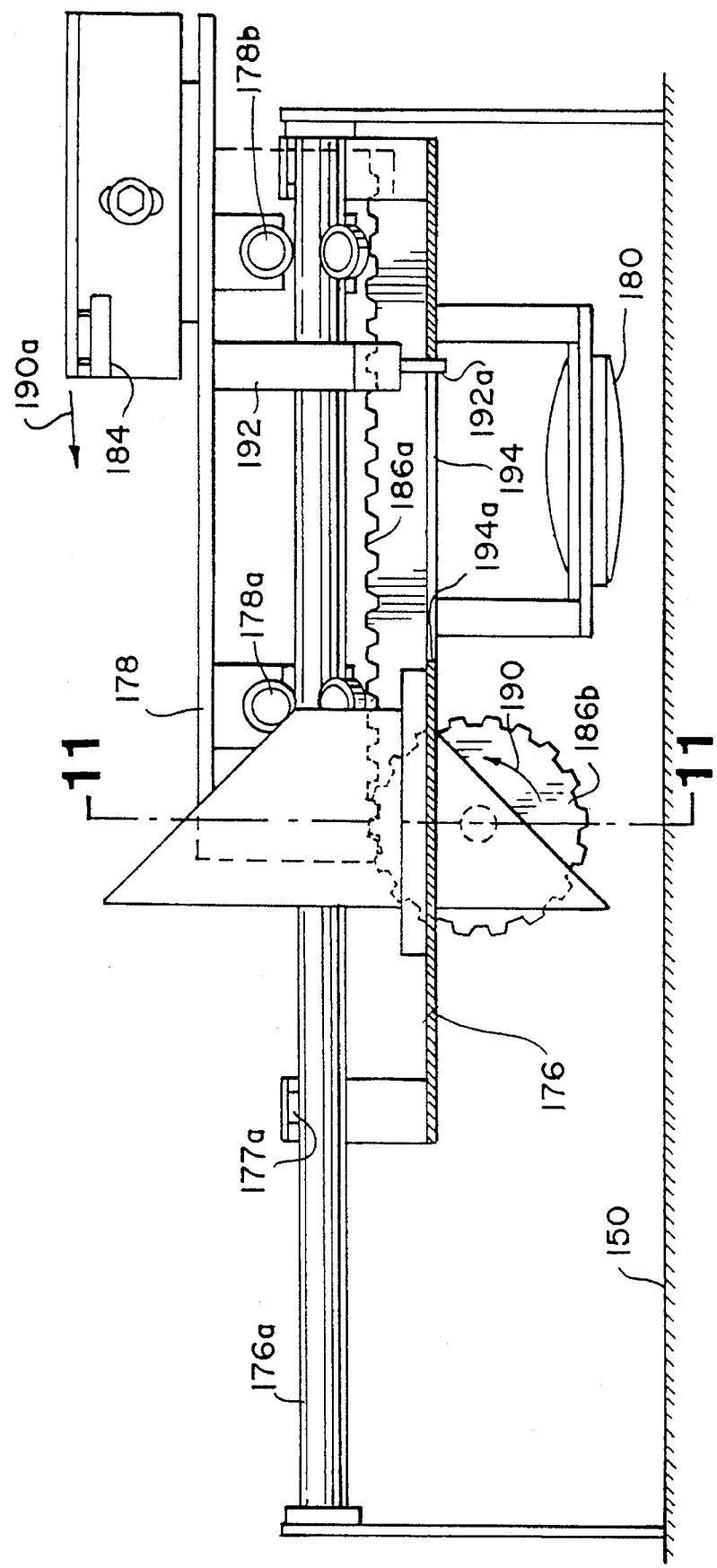
FIG. 10A is a side elevational view of the scanner system in an initial non-digitizing position.

FIG. 10A illustrates the beginning of the scanning process. To effect the initial positioning of the scanning stage, elements 176 and 178 are being moved to an initial scanning position by the motor 186 rotating the pinion gear 186b in a direction 190. The sensor portion 178 is coupled to the motor 186 via the rack and pinion drive system 186a, 186b. The first portion 176 of the digitizing stage, however, is not so connected.

A coupling member 192 extends from the sensor element 178 through a slot 194 in the first element 176. As the second element 178 moves in a direction 190a, in response to rotation of the shaft of the motor 186, a free end 192a of the coupling member 192 rides in the slot 194 and approaches an end 194a thereof. During this time interval the second element 178 is being driven by the motor 186 but the first element 176 is not moving.

The reformatting element 176 is slidably supported on first and second elongated cylindrical shafts 176a, 176b (best seen in FIG. 11) carried by the housing 150. Nylon pads 177a, b and c carried by the reformatting element 176 provide bearing surfaces which slidably engage the shafts 176a, 176b.

The sensor stage 178 is carried on six spaced-apart ball bearings 178a–d. The bearings 178a–d ride on the shafts 176a, b. The bearings are spring loaded via spring 179.

Figure 10B:
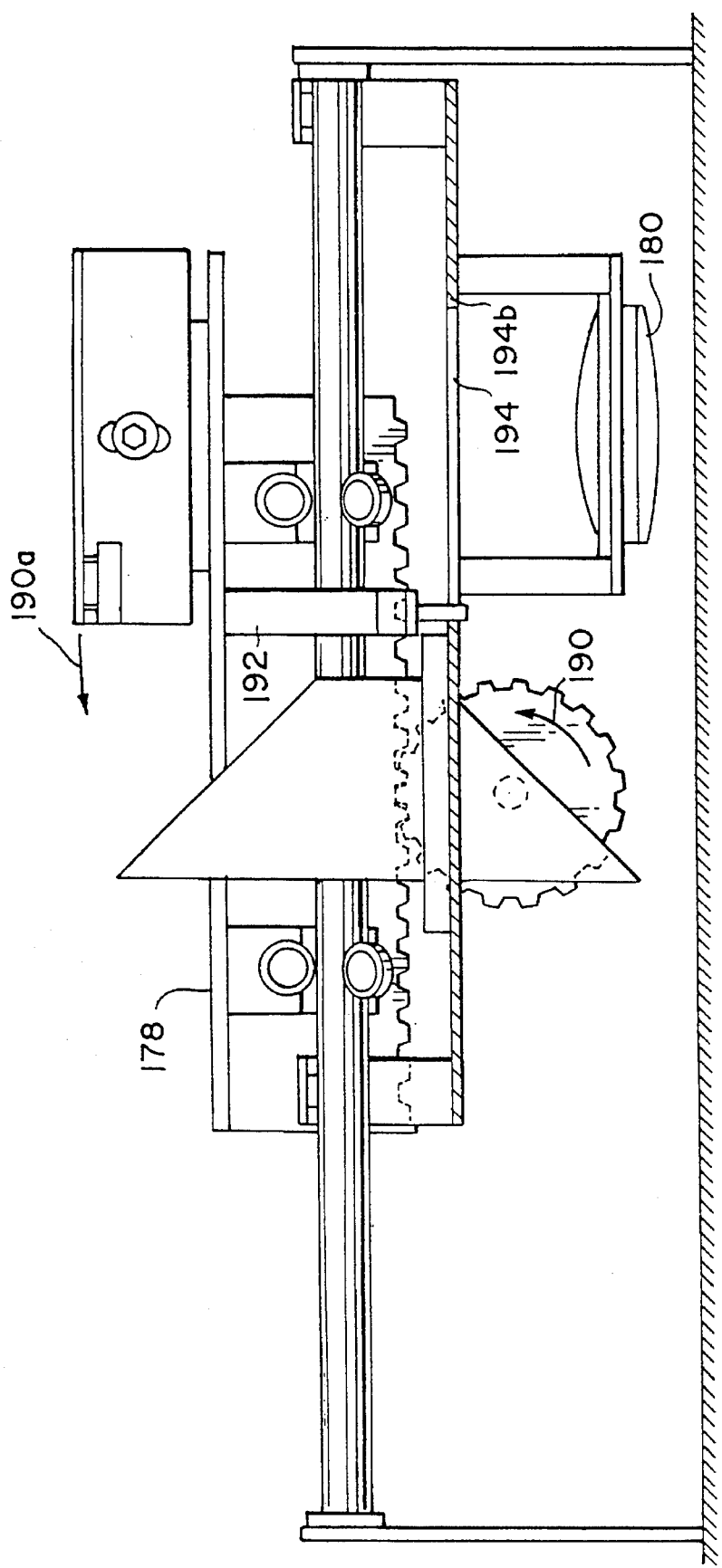
FIG. 10B is a side elevational view of the scanner system moving toward a digitizing position.

FIG. 10B illustrates a second phase of the scanning process. In this phase the free end 192a of the coupling member 192 has engaged the end surface 194a of the slot 194. At the same time, the sensor element 178 continues to move in the direction 190a under the control of the motor 186.

The engagement of the free end 192a and the surface 194a then causes the first element 176 to move with the second element 178 in the direction 190a. This movement continues until an optical switch, not illustrated, opens. The motor 186 then stops at a "start of scan" position.

FIG. 10C illustrates a "start of scan" condition. In this condition the sensor element 178 and the reformatting element 176 are both positioned together at the "start of scan" position. (The sensor element 178 has moved the reformatting element 176 to this position.) At this time the direction of rotation of the motor 186 reverses as illustrated at 190b.

Note that, via the lens 180, the image I will be projected directly onto the plane through which the CCD sensor 184 will travel. No mirrors are necessary.

As a result of the interaction between the rack and pinion drive system 186a, 186b the motor 186 moves the sensor stage 178 opposite the direction 190a, in a direction 190c, to carry out the scanning operation. At this time the coupling end 192a disengages the surface 194a.

The reformatting lens 180 has now been positioned in the light path of the projected image I of the medium M. As a result, as the sensor portion 178 is moved in the direction 190c the CCD-type sensor 184 is scanned across the image projected through the reformatting lens 180. The CCD-type sensor 184 then produces a plurality of electrical signals corresponding to the intensity of the incident image I as the sensor is moved across the reformatting lens 180.

Figure 10D:
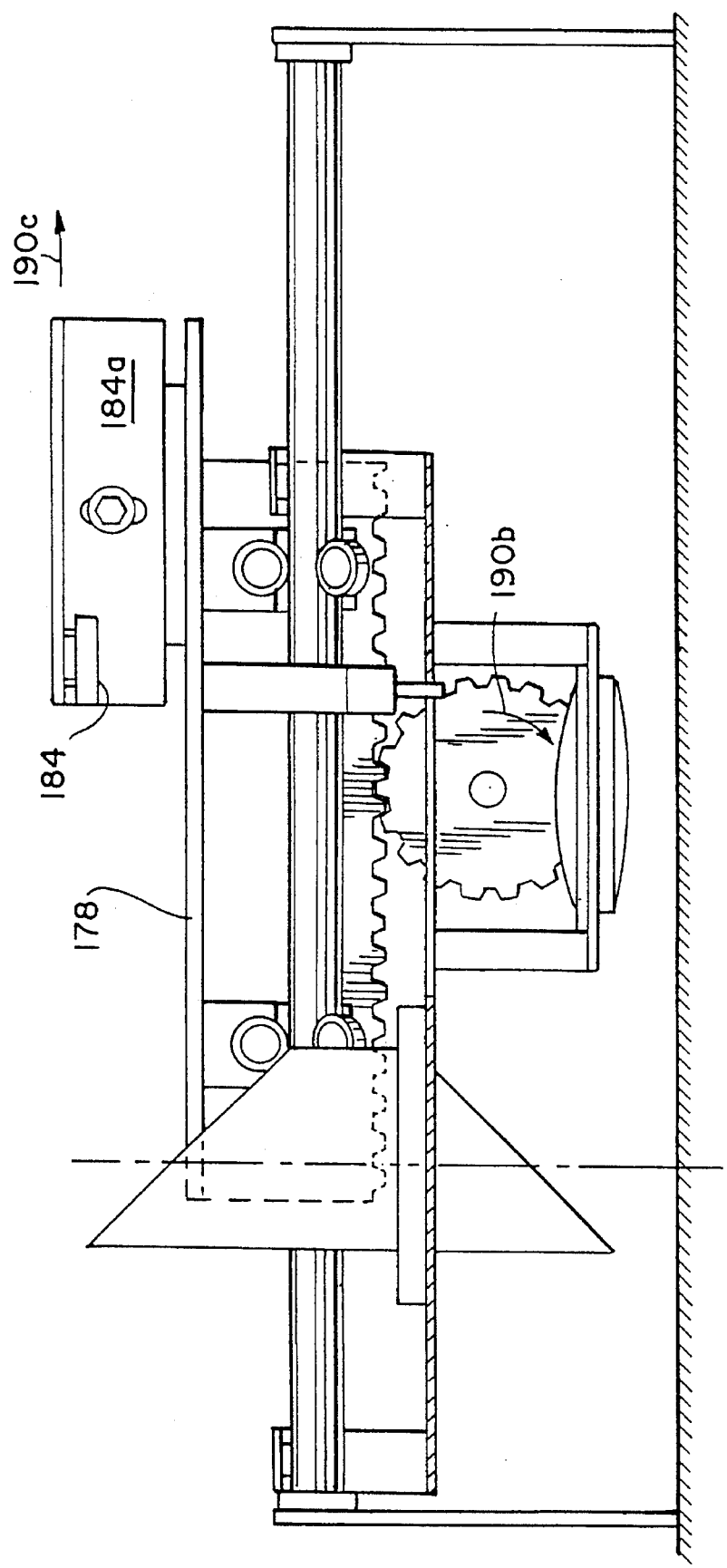
FIG. 10D is a side elevational view of the scanner system when the digitizing process has been concluded.

FIG. 10D illustrates the "end of scan" position. In this position the sensor element 178 has traveled past the reformatting lens 180, after having scanned the image projected therethrough which is incident on the CCD-type sensor 184. The free end 192a of the coupling 192 has engaged end surface 194b of the slot 194.

As the second element 178 continues moving in the direction 190c, in response to the motor 186, the reformatting element 176 is slid along therewith and both elements return to the initial non-scanning position. In this position the reformatting lens 180 has been moved out of the path of the projected image I from the medium M and that image is again projected onto the viewing screen 174.

The coupling element 192 is resilient so as to minimize the interaction shock when the free end 192a comes into contact with the surface 194b at the "end of scan" location. The motor 186 then moves both elements from the scanning stage to a home position and movement thereof can be terminated using an optical switch.

Figure 11:
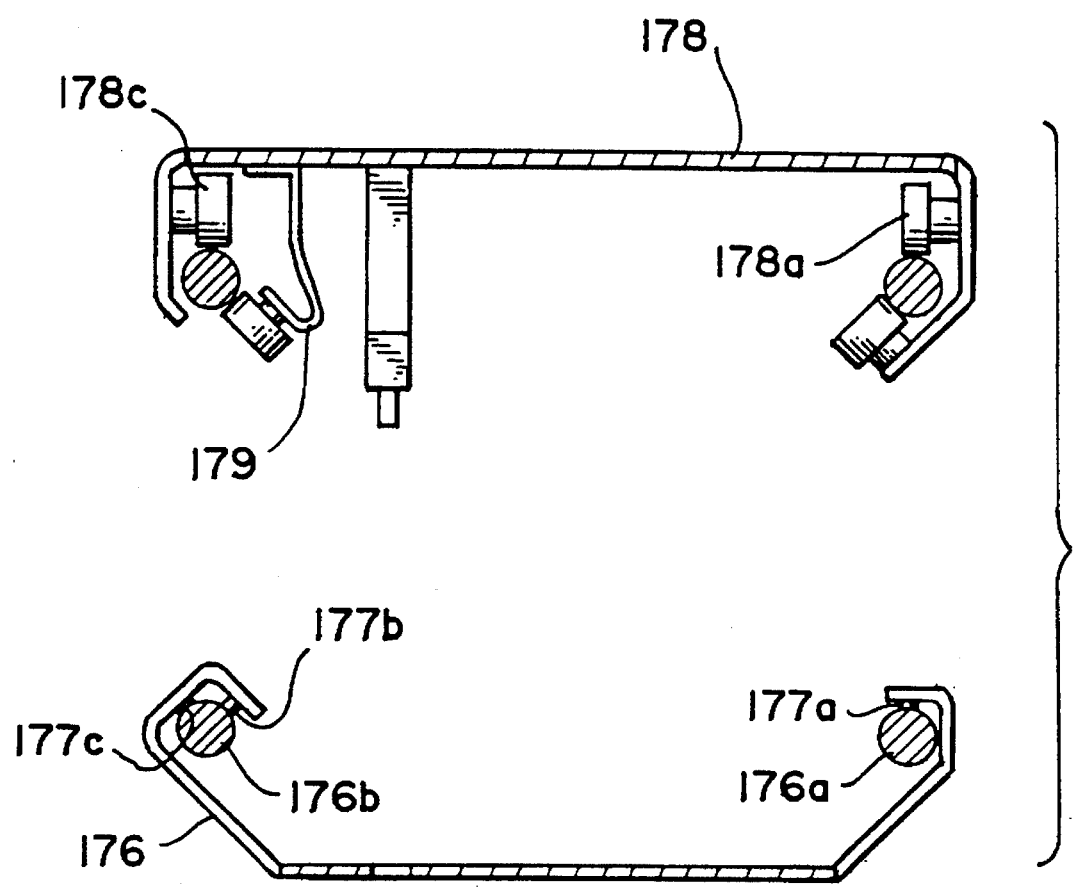
FIG. 11 is a sectional view of the bearing design of the scanner system of FIG. 8 taken along plane 11—11 of FIG. 10A.

FIG. 11 illustrates the details of the bearing system. Both the reformatting element 176 and the sensor element 178 are carried on the shafts 176a, b.

A mount 184a supporting the CCD sensor 184 can be moved up or down for focusing. This is the only adjustment required for the scanner system.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An imaging system for viewing and providing a digital representation of a two-dimensional image carried on a film medium comprising:

a housing;

a source of radiant energy carried by said housing;

a support carried by said housing for positioning the medium relative to said source for projection of a selected image carried thereon;

a linear motion apparatus carried by said housing, wherein said apparatus has a linearly movable slide with a viewing position and a digitizing position;

first and second mirrors carried linearly by said slide wherein said first mirror reflects said projected image onto said display surface when said slide is in said viewing position;

a sensor, carried by said housing, wherein said second mirror reflects said projected image onto said sensor when said slide is in said digitizing position;

a unit for storage of a digitized representation; and a control circuit coupled between said sensor and said storage unit for generating a digitized representation of an image incident on said sensor, and for directing the digitized representation to said unit for storage.

2. An imaging system as in claim 1 wherein said apparatus carries a lens adjacent to one of said mirrors.

3. An imaging system as in claim 1 wherein said control circuit includes a programmable digital processor.

4. An imaging system as in claim 1 including further, optical limit switches carried by said housing for limiting movement of said slide.

5. An imaging system as in claim 1 wherein said sensor is a linear element and including a linear movement mechanism for moving said sensor, thereby scanning an image reflected from said second mirror.

6. An imaging system as in claim 5 wherein said linear movement mechanism includes a lead screw and a plurality of linear bearing elements.

7. An imaging system as in 6 including further optical limit switches carried by said housing for limiting movement of said sensor.

8. An imaging system as in claim 1 wherein said first mirror has a first orientation and wherein said second mirror has a second orientation.

9. An imaging system as in claim 1 including further a lens system carried by said housing and positioned, at least in part, between said source and said support.

10. A method of viewing and digitizing a projectable image prestored on a film medium using first and second reflectors, comprising:

positioning the first reflector at a selected position;

projecting the image from the film medium, using the first reflector, onto a viewing region;

linearly moving the first reflector from the selected position and linearly moving the second reflector thereto;

projecting the image from the film medium, using the second reflector onto a digitizing region; and digitizing the image.

11. A method as in claim 10 including optically detecting when said second reflector has moved into the selected position.

12. An apparatus for displaying images prestored on a movable medium and for generating a digitized representation thereof comprising;

a housing;

a medium support carried by said housing;

a source of radiant energy directed to impinge on and pass through, at least in part, an image prestored on a medium carried on said medium support so as to create a projected image;

a scanning stage having first and second parts, carried by said housing, movable relative to one another, and linked via a coupling member, said scanning stage being movable between a displaying position and a digitizing position, said first part carrying a lens, and said second part carrying a sensor;

a motor coupled to said second part for moving said stage in said first direction to a digitizing position wherein said lens is positioned to permit said projected image to pass therethrough and for subsequently moving only said second part opposite said first direction thereby scanning the image.

13. An apparatus as in claim 12 wherein said motor subsequently moves said stage, opposite said first direction, away from said digitizing position to said displaying position wherein said lens is positioned away from said projected image.

14. An apparatus as in claim 12 including a control unit coupled to said second part for receiving and storing a digital representation of the image.

15. An image displaying and digitizing device for displaying or digitizing images on a moveable medium comprising:

a housing;

a medium support carried by said housing; and a two part structure for scanning an image projected from said medium, said structure having first and second parts movably mounted on said housing, and movable relative thereto, wherein said structure is movable from a non-digitizing position to a digitizing position wherein said second part is movable relative to said first part so as to scan across the image, said first part having a reformatting lens and said second part having a sensor, said reformatting lens permitting said projected image to pass therethrough when in said digitizing position, said reformatting lens being spaced from said projected image when in said non-digitizing position.

16. An apparatus as in claim 15 including a projection screen wherein said projected image is displayed on said projection screen when said two part structure is in said non-digitizing position.

17. An apparatus as in claim 16 including an inversion prism carried on said first part.

18. An apparatus as in claim 17 wherein said projected image passes through said inversion prism when said two part structure is in said non-digitizing position.

19. An apparatus as in claim 15 wherein said image is projected directly onto said sensor without being reflected by a reflection means.

* * * * *